Dec. 2, 1924.

C. B. MILLS 1,517,306

INCLOSED VENTILATED MOTOR

Filed Nov. 21, 1918     2 Sheets-Sheet 1

WITNESSES:
H. T. Shelhamer
F. A. Lind

INVENTOR
Chester B. Mills
BY
Wesley G. Carr
ATTORNEY

Dec. 2, 1924.                             1,517,306
C. B. MILLS
INCLOSED VENTILATED MOTOR
Filed Nov. 21, 1918          2 Sheets-Sheet 2

WITNESSES:
H. J. Shelhamer
F. A. Lind.

INVENTOR
Chester B. Mills
BY
Wesley G. Carr
ATTORNEY

Patented Dec. 2, 1924.

1,517,306

UNITED STATES PATENT OFFICE.

CHESTER B. MILLS, OF EAST McKEESPORT, PENNSYLVANIA, ASSIGNOR TO WESTING-HOUSE ELECTRIC & MANUFACTURING COMPANY, A CORPORATION OF PENNSYL-VANIA.

INCLOSED VENTILATED MOTOR.

Application filed November 21, 1918. Serial No. 263,571.

*To all whom it may concern:*

Be it known that I, CHESTER B. MILLS, a citizen of the United States, and a resident of East McKeesport, in the county of Allegheny and State of Pennsylvania, have invented a new and useful Improvement in Inclosed Ventilated Motors, of which the following is a specification.

My invention relates to dynamo-electric machines having particular relation to machines of the inclosed type wherein a current of air is continuously circulated within the frame thereof without, at any time, coming into direct engagement with the outside air, and it has for its object to provide a novel system of ventilation for use in machines of the above indicated character which may be simple and inexpensively constructed.

Figure 1:
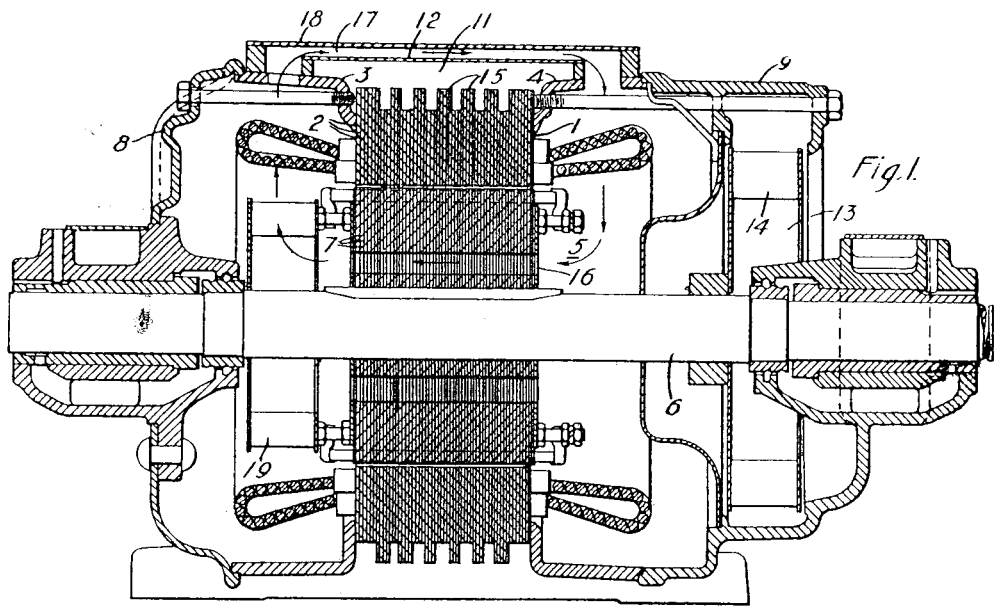
Figure 2:
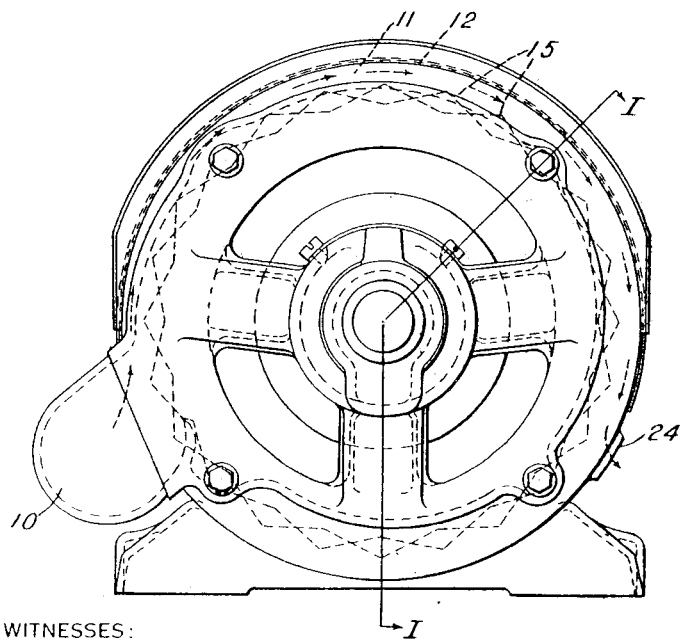
Figure 3:
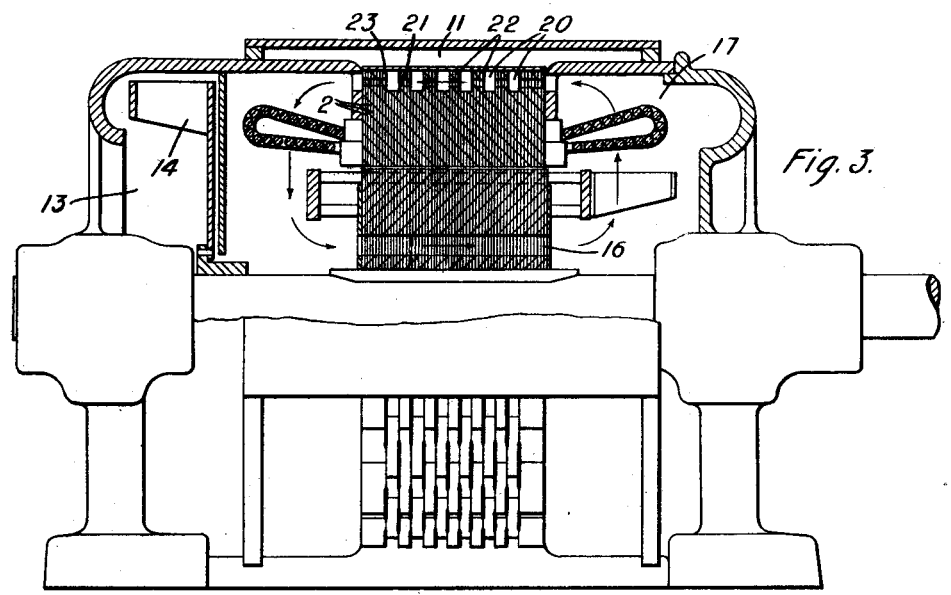
Figure 4:
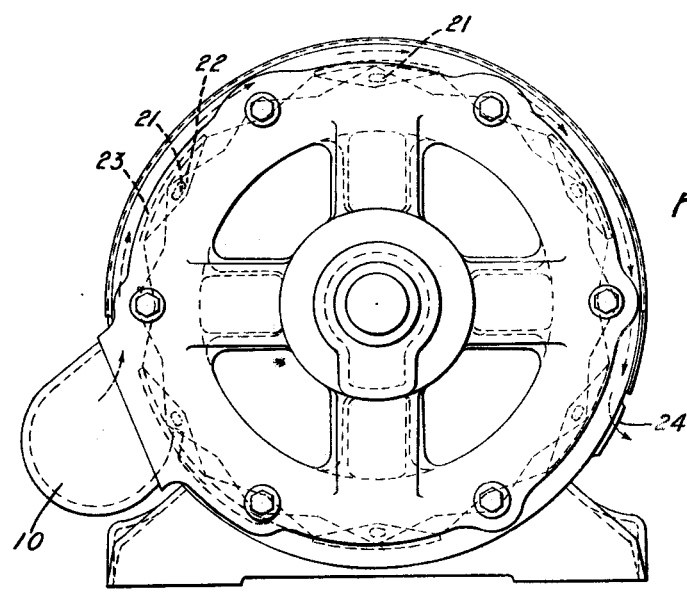

In the accompanying drawings, Fig. 1 is a sectional view of a motor embodying my invention; and Fig. 2 is an end elevational view of the motor shown in Fig. 1; Fig. 3 is a sectional view, similar to Fig. 1, of a slight modification thereof; and Fig. 4 is an end elevation of the structure shown in Fig. 3.

Heretofore, in mills wherein the atmosphere contains lint such, for example, as cotton mills, motors of the open ventilated type have been used, the ventilating spaces being relatively large so that they would not be clogged with particles of lint adhering to the sides thereof. However, the lint forms coatings upon the windings and in the ventilating spaces which prevent the proper radiation of heat, thus causing the machine to overheat seriously and rendering it necessary to disassemble and clean the machine at least twice a year.

By my invention, I provide a dynamo-electric machine provided with an internal inclosed and an external air circuit which are brought into close proximity to each other in a novel manner and in which the external circuit is adapted to be readily cleaned.

For a better understanding of my invention, reference may now be had to the drawings in which I show a motor provided with a stator 1 comprising laminations 2, end frames 3 and 4, and a rotor 5 comprising a shaft 6 and rotor laminations 7. The motor is inclosed by end bells 8 and 9 which prevent the entrance of outside air thereinto. The external-air passages include a fan chamber 13, within which a fan 14 rotates and causes cooling air to enter an air duct 10 and to flow therefrom into a circumferential passage 11 formed by a substantially annular enclosing casing 12 which circumferentially encloses the laminations 2 but is spaced therefrom, and through an exit port 24. The laminations 2 are of irregular peripheral contour, as best shown in Fig. 2, and are mounted in staggered groups, thus providing projections 15 that extend into the external-air passage 11 and serve to churn the air passing therethrough. The internal or inclosed-air path includes longitudinal ducts 16 through the rotor laminations 7, the spaces between the armature and the enclosing end members 8 and 9 and a substantially circumferential chamber 17 formed by a casing 18 that encloses, but is spaced from, the casing member 12. The air in this passage is moved by means of a fan 19. Although the air passage 17 is substantially circumferential, the air is moved therethrough in a longitudinal direction. Thus, it will be seen that the air passing through the passage 11 will, on one side, engage and be churned by the outer peripheries of the laminations 2 and, on the other side, will engage the casing member 12 to which is transmitted a portion of the heat energy of the air passing through the passage 17. The passage 17 is provided with a relatively large external surface, thus allowing a large amount of space for heat radiation on both sides of the passage.

In the modification disclosed in Figs. 3 and 4, the external-air passage includes an entrance duct 10, a circumferential passage 11 and an exit duct 24, all similar to the structure described in connection with Figs. 1 and 2. The internal passage 17, however, is somewhat different, since it includes longitudinal air ducts 16, the spaces between the end-enclosing members 8 and 9 and the laminations, and a tortuous longitudinal passage 20 formed by openings 21 punched through a series of alined projections 22 on the peripheries of the stator laminations 2. The air in this path is prevented from coming into engagement with the air in the external path by means of arcuate plates 23 which extend between the projections 22 and are attached to projections on the sides thereof, thus forming a good radiating surface adjacent the external air passage. The chief distinction between the structure shown in Fig. 1 and the structure shown in Fig. 3 is that, in Fig. 1, the internal-air passage includes the external chamber on the periphery of the machine, while, in the modification shown in Fig. 3, the external-air passage includes the external air chamber. A fan member 14, in a separate chamber 13, draws air from the outside and forces it into the passage 11 through the port 10 substantially as in the structure shown in Fig. 1.

From the foregoing description, it will be understood by those skilled in the art that a motor constructed in accordance with my invention will be almost entirely free from foreign matter derived from the atmosphere in which it is operating, and the portions that are not free from such matter may be readily removed for cleaning.

Throughout this specification and the claims attached hereto, the terms "internal circuit or path" are to be understood as defining a passage the traversing medium of which is not continuously renewed from the outside atmosphere but is continuously circulated within the enclosing casing. The terms "external air path" are to be understood as defining a passage through which air from outside of the machine is continuously circulated.

Although I have shown my invention in only two forms, it will be obvious to those skilled in the art that it is not so limited but is susceptible of various minor changes and modifications without departing from the spirit thereof, and I desire, therefore, that only such limitations shall be placed thereupon as are imposed by the prior art or are specifically set forth in the appended claims.

I claim as my invention:

1. In an inclosed dynamo-electric machine, a stator member of laminated structure, two casings disposed adjacent to said structure and forming inner and outer circumferential chambers, the outer periphery of said laminated structure constituting one of the walls of said inner chamber, said inner chamber being in communication with the exterior atmosphere and the outer chamber being closed with respect thereto, and means for circulating independent currents of air through said chambers.

2. In an inclosed dynamo-electric machine, a stator member of laminated structure, two circumferential casings of different diameters circumferentially enclosing said structure and spaced therefrom and from each other to form inner and outer circumferential chambers, the outer periphery of said laminated structure constituting the inner wall of said inner chamber, said inner chamber being in communication with the exterior atmosphere and the outer chamber being closed with respect thereto, and means for circulating independent currents of air through said chambers.

3. In an inclosed dynamo-electric machine, a stator member of laminated structure, two circumferential casings of different radii of curvature circumferentially enclosing said structure and spaced therefrom and from each other to form inner and outer circumferential chambers, the outer periphery of said laminated structure being of irregular contour and constituting the inner wall of said inner chamber, and means for causing a circumferential current of air in said inner chamber and for causing an independent longitudinal current of air in said outer chamber.

In testimony whereof, I have hereunto subscribed my name this 31st day of Oct., 1918.

CHESTER B. MILLS.